United States Patent [19]

Reece

[11] Patent Number: 5,385,064
[45] Date of Patent: Jan. 31, 1995

[54] DUAL CLUTCH COUNTERSHAFT AUTOMATIC TRANSMISSION

[75] Inventor: John W. Reece, Ithaca, N.Y.

[73] Assignee: Borg-Warner Automotive, Inc., Sterling Heights, Mich.

[21] Appl. No.: 965,508

[22] Filed: Oct. 23, 1992

[51] Int. Cl.$^6$ ............................................. F16H 3/08
[52] U.S. Cl. ........................................ 74/331; 74/333
[58] Field of Search ................... 74/325, 331, 332, 333

[56] References Cited

U.S. PATENT DOCUMENTS

| | | | |
|---|---|---|---|
| Re. 33,336 | 9/1990 | Bainbridge et al. . | |
| 3,313,173 | 4/1967 | Szodfridt et al. . | |
| 3,324,745 | 1/1968 | Szodfridt . | |
| 3,394,610 | 7/1968 | Szodfridt . | |
| 3,398,603 | 8/1968 | Szodfridt et al. . | |
| 3,473,327 | 10/1969 | Szodfridt . | |
| 3,537,257 | 11/1970 | Webster et al. . | |
| 3,552,235 | 1/1971 | Szodfridt . | |
| 3,561,291 | 2/1971 | Webster et al. . | |
| 3,654,819 | 4/1972 | Link | 74/325 |
| 3,688,596 | 9/1972 | Szodfridt . | |
| 3,774,460 | 11/1973 | Browning et al. . | |
| 3,774,474 | 11/1973 | Recker et al. . | |
| 3,774,475 | 11/1973 | Meysenburg et al. . | |
| 3,916,714 | 11/1975 | Sisson et al. | 74/331 O |
| 3,939,733 | 2/1976 | Wetrich . | |
| 4,145,935 | 3/1979 | Herlitzek | 74/325 X |
| 4,448,293 | 5/1984 | Maeda | 192/3.3 O |
| 4,461,188 | 7/1984 | Fisher | 74/330 |
| 4,463,621 | 8/1984 | Fisher | 74/330 |
| 4,476,737 | 10/1984 | Young . | |
| 4,485,687 | 12/1984 | Burke et al. . | |
| 4,544,057 | 10/1985 | Webster et al. . | |
| 4,558,607 | 12/1985 | Szodfridt . | |
| 4,565,106 | 1/1986 | Sumiyoshi . | |
| 4,627,301 | 12/1986 | Bainbridge et al. . | |
| 4,667,526 | 5/1987 | Young . | |
| 4,697,471 | 10/1987 | Hiketa . | |
| 4,714,147 | 12/1987 | Szodfridt et al. . | |
| 4,726,246 | 2/1988 | Whalen | 74/333 X |
| 4,777,837 | 10/1988 | Lehle | 74/333 X |
| 4,785,682 | 11/1988 | Nishimura et al. | 74/359 |
| 4,831,894 | 5/1989 | Braun | 74/331 X |
| 4,876,923 | 10/1989 | Crandall et al. | 192/3.3 X |
| 4,998,604 | 3/1991 | Vukovich et al. | 192/3.3 O |
| 5,035,682 | 7/1991 | Nakayama et al. | 475/66 O |
| 5,069,657 | 12/1991 | Taniguchi et al. | 475/283 O |
| 5,090,950 | 2/1992 | Sugano et al. | 475/129 O |
| 5,171,294 | 12/1992 | Takano et al. | 475/249 O |
| 5,178,588 | 1/1993 | Hashimoto et al. | 475/331 O |
| 5,186,065 | 2/1993 | Downs | 74/331 O |

FOREIGN PATENT DOCUMENTS

| | | |
|---|---|---|
| 0354890A | 2/1990 | European Pat. Off. . |
| 2156455A | 10/1985 | United Kingdom . |
| WO8700254 | 1/1987 | WIPO . |

OTHER PUBLICATIONS

Article: "A Fully Automatic Vehicle Transmission Using a Layshaft Type Gearbox", Webster, 1981 SAE.
Article: "Das Porsche-Doppelkupplungs-(PDK)-Getriebe", (date unknown).
Article: "Evolutionary Shift", Road & Track, 1987.

*Primary Examiner*—Dirk Wright
*Attorney, Agent, or Firm*—Brooks & Kushman; Greg Dziegielewski

[57] ABSTRACT

A countershaft automatic transmission for vehicular use is disclosed. The transmission has four forward gears which operate using two clutches and two dual synchronizers, The two clutches are mounted on a main shaft with associated gear clusters and the synchronizers are mounted on a countershaft with associated mating gear clusters. Reverse gear uses another synchronizer mounted on a lay shaft with associated gearing. Gear engagement is accomplished by actuating a hydraulic clutch after having shifted a synchronizer to select the gear to be engaged.

5 Claims, 3 Drawing Sheets

DUAL CLUTCH COUNTERSHAFT AUTOMATIC TRANSMISSION

TECHNICAL BACKGROUND

The present invention relates to countershaft automatic transmissions for vehicles, particularly dual clutch countershaft transmissions which utilize synchronizers.

BACKGROUND ART

In recent years, the automotive industry has made many improvements in their vehicles and engines to reduce noxious emissions and to increase fuel efficiency. Although the weight of the vehicle and the size and type of engine used are significant factors in meeting these objectives, the type of transmission used is also a significant factor.

With a manual transmission, noxious emissions are created when the gears are being shifted since the engine load, speed and throttle opening are changed. This is particularly objectionable in urban driving where stop and go traffic is encountered.

Automatic transmissions generate less objectionable emissions during gear change than manual transmissions due to the power shifting capability of automatic transmissions. But automatic transmissions also have inherent features which reduce their efficiencies. In this regard, automatic transmissions use multiple plate hydraulic clutches for gear engagement. Clutches of this type, left unengaged or idling, impose a parasitic drag torque on a drive line due to the viscous shearing action which exists between the plates and discs rotating at different speeds relative to one another. This torque reduces the efficiency of the transmission although not as much for a countershaft automatic transmission as compared to a planetary automatic transmission.

It is an object of the present invention to provide a new vehicular transmission which has improved fuel efficiencies over prior and known transmissions. It is another object of the present invention to provide an improved countershaft automatic transmission which creates increased fuel efficiency for the vehicle.

It is a further object of the present invention to provide an automatic transmission which is amenable to production within existing facilities for manual transmissions.

These and other objects, features and advantages of the invention will become apparent from the following description of the invention when taken in view of the following claims and appended drawings.

DISCLOSURE OF INVENTION

The present invention relates to a countershaft automatic transmission with four forward gears which uses two clutches and two dual synchronizers. The gear engagement for the transmission is accomplished by actuating an hydraulic clutch after having shifted a synchronizer to select the gear to be engaged.

The design offers increased efficiency by reducing the viscous drag losses caused by idling clutches in a conventional planetary transmission. The invention also provides power shift, rock cycle and preselect capabilities. Also, since countershaft automatic transmissions are similar to manual transmissions with respect to gears, shafting, bearings and synchronizers, the countershaft development of the present invention can be produced within existing facilities for manual transmissions.

The present invention utilizes a dual clutch pack mounted on the main shaft of the transmission. A three-position synchronizer is associated with each of the clutches and accompanying gear cluster. When any of the four forward gears is engaged, only one of the two synchronizers is utilized leaving the other in a neutral position and its associated gear cluster uncoupled from its shaft. The two synchronizers are positioned on the countershaft which also mounts the mating gears. While in any forward gear, the next gear up or down is preselected (by use of its otherwise neutral synchronizer) and then engaged to drive when the clutch associated with it is energized as the other clutch is released.

In the forward speeds only one clutch at a time is energized. The design lends itself to manual as well as automatic operation. In manual mode the forward speeds may be operated by an up-down toggle: no conventional gearshift is required.

A lay shaft is provided to accommodate the reverse gear. The clutches are alternately energized to produce a rock cycle. The reverse gear is selected by the reverse gear synchronizer with the lay shaft at rest without the engagement of a separate clutch for reverse.

The present invention uses a number of common components and the major bearings are favorably aligned laterally to each other.

In an alternate embodiment of the invention, the two clutches are separated and not packaged in a common housing. In this embodiment, the lay shaft for reverse gear is brought closer to the main shaft and reduces the size of the transmission package. The changed location of the lay shaft in this alternate design requires the axial positions of the bearings to be changed.

EMBODIMENT OF THE INVENTION

Figure 1:
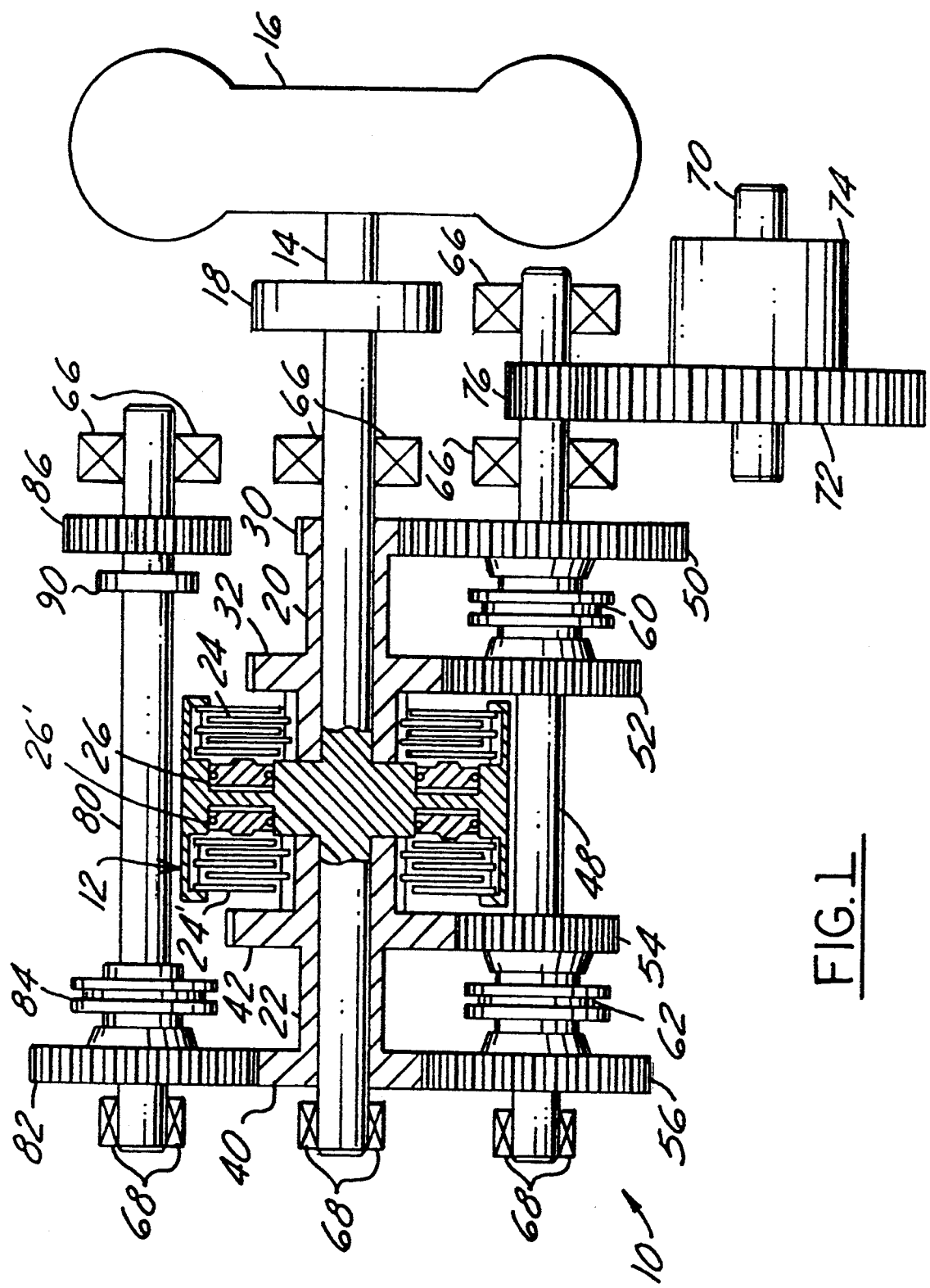
FIG. 1 is a schematic sectional view of a countershaft automatic transmission in accordance with the present invention.
Figure 2:
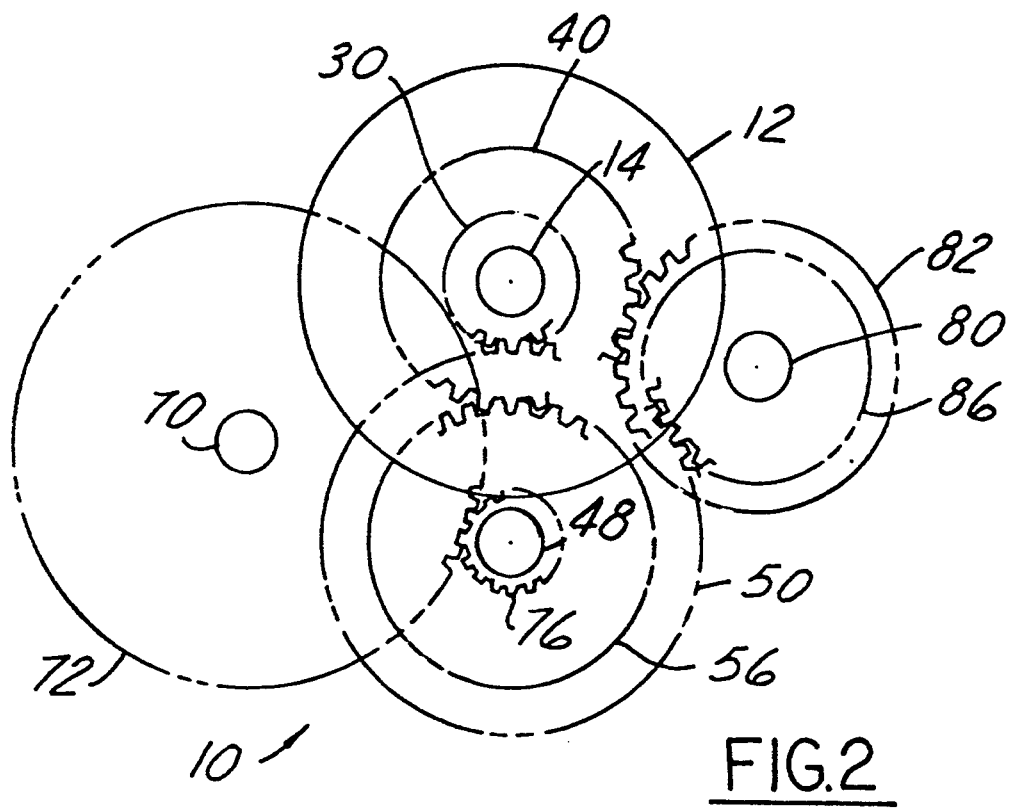
FIG. 2 is an end view of the transmission of FIG. 1 showing schematically the layout and interaction of the various gears and shafts; transmission in accordance with the present invention.

The preferred embodiment of the present invention is shown in FIGS. 1-2. The transmission is generally denoted by the reference numeral 10 in the drawings.

The transmission 10 uses a single dual-clutch package 12. The clutch package 12 is mounted on the main shaft 14. Power from the engine is conveyed to the main shaft 14 by torque converter 16. Oil pump 18 provides lubrication for the system.

Gear clusters 20 and 22 are rotatably mounted on the main shaft 14. The dual clutch package 12 includes two sets of plates and discs 24 and 24' along with hydraulic pistons 26 and 26' which operate them.

Gear cluster 20 operates the first and third gears. A pinion gear 30 is provided for the first gear and pinion gear 32 is provided for the third gear. The gear cluster 20 is operated by the adjacent portion of the dual clutch package 12.

Gear cluster 22 operates the second and fourth gears of the four-speed transmission. The gear cluster 22 includes pinion gear 40 for second gear and pinion gear 42 for the fourth gear. The gear cluster 22 is operated by the immediately adjacent half of clutch package 12.

The automatic transmission 10 also includes a countershaft 48 which is positioned below the main shaft 14. Gears 50, 52, 54, and 56 are mounted on countershaft 48. These gears mate, respectively, with pinion gears 30, 32, 42, and 40 on the main shaft.

Synchronizers 60 and 62 are also coupled to the countershaft 48. When its associated clutch is disengaged, one of gears 50, 52, 54 or 56 is selected by one of the synchronizers 60 and 62 accordingly. Thereafter, in order to engage the drive to the selected gear, the corresponding clutch is energized.

The final drive from the transmission is taken off from the main drive shaft 70. The final drive is engaged by gear 72 to differential 74. Gear 72 is driven by pinion gear 76 mounted on the countershaft 48.

Lay shaft 80 is provided to accommodate the reverse gear. Gear 82, driven by gear 40, is coupled to lay shaft 80 by synchronizer 84 which selects the reverse gear. The lay shaft also mounts gear 86 which is in constant mesh with gear 50 on the countershaft 48. For reverse gear, as well as first gear, synchronizer 60 couples gear 50 to the countershaft 48. Reverse gear is engaged when clutch 24' is actuated.

A parking wheel 90 is also provided on the lay shaft 80. In order to effect parking, it is necessary that synchronizer 60 be shifted in order to engage gear 50 which is thereby locked to the countershaft 48. Such shifting of synchronizer 60 could be an automatic feature of the vehicle as the vehicle is slowed to rest. The car would then be ready to take off in first gear when the clutch is actuated. On the other hand, if the car is to be moved in reverse, the synchronizer 60 is in such case already in position. As an alternative to a parking wheel 90, the synchronizer 60 could have teeth on one side and be used as a parking wheel.

For ease of reference, a brief description of the movement of the gears, clutches and synchronizers will be provided. In this regard, reference should be made to FIG. 1 with movement to the right being in the direction of the torque converter in the drawing while movement to the left is in the direction of gears 56 and 82.

When the transmission is in park or neutral, neither of the clutches 24 or 24' is actuated. The synchronizers 60, 62 and 84 can be in any position so long as the clutches are not operated. For all forward speeds it is necessary that gear 82 rotate freely on the lay shaft 80, or in other words that synchronizer 84 be disengaged from gear 82.

When first gear is actuated, synchronizer 60 is moved to the right-hand position to engage gear 50, and clutch 24 is actuated. Since clutch 24' remains disengaged, the synchronizer may be in any position. If it is in the left-hand position, it is ready for second gear. Then, when the clutch actuation is interchanged (clutch 24 released and clutch 24' operated), second gear is attained.

In third gear, synchronizer 60 is shifted left, clutch 24' is released, and clutch 24 is operated. Then for fourth gear, synchronizer 62 is shifted right (to lock gear 54 to countershaft 48), clutch 24 is released and clutch 24' is operated.

The countershaft automatic transmission described above has numerous features and advantages. In use, the transmission only energizes one clutch at a time when in gear. Also, the two clutches can use identical parts since each is mounted on the main shaft and at most delivers 100% of the turbine shaft torque.

Note that in sequencing the forward speeds, the actuation of the clutches 24 and 24' is interchanged at each step. For maximum economy (no viscous drag), whichever synchronizer is not currently driving is in the neutral mode (center position). Otherwise it may be in the right or left position anticipating the direction of the next shift.

For reverse gear, synchronizer 60 must be in right-hand position, 62 must be neutral, 84 must be in engaged position with gear 82, then clutch 24' is actuated.

In the rock cycle, the synchronizer set-up is exactly as for reverse, but the clutches are alternately actuated: namely operating clutch 24 engages first gear, while operating 24' engages reverse gear.

The synchronizers 60 and 62 on countershaft 48 are three position units with left, right, and center-neutral positions. When any forward gear is engaged, one of these two synchronization units is employed, but the other can be left in its neutral position. As a result, the associated gear cluster for the unengaged synchronizer is uncoupled from its shaft, thereby eliminating viscous drag torque from the idle clutch for maximum efficiency.

While in any forward gear, the next gear up or down may be preselected (by use of its otherwise neutral synchronizer), and then engaged to drive when the clutch associated with it is energized as the other clutch is released. For example, when in first gear, second gear is the logical next selection; whereas while in fourth gear, the next logical selection is third gear. From second gear, the usual next shift would be up to third gear except when approaching a stop; whereas from third gear the expected next shift, up or down, would depend on such factors as present throttle position, speed, and acceleration.

Another feature of the invention is that actuation (not shown) for synchronizer 60 and 62 is preferably hydraulic or electromechanical. The reverse synchronizer 84 is operated by direct manual actuation.

When in reverse gear, the rock cycle capability is provided by alternately energizing the clutches. This is achieved because for reverse gear, in addition to gear 82 being coupled by otherwise neutral synchronizer 84, gear 50 must be coupled by synchronizer 60 as for first gear.

The mechanization of the reverse gear is another feature of the present invention. A drive is taken from gear 40 on the main shaft 14, sharing for reverse the clutch that activates gear cluster 22 for gear 40. Gear 86 on lay shaft 80 meshes with gear 50 on the countershaft 48. This arrangement allows reverse gear to be selected by synchronizer 84 with lay shaft 80 at rest and without the addition of a separate clutch. Overall, the present invention features a relatively uniform design allowing use of many common components. Also, the principal bearings are aligned laterally from each other and therefore use the same members as the other bearings, which is a beneficial design feature.

In FIG. 1, the bearings for the shafts 14, 48 and 80 are designated by the reference numerals 66 and 68.

Figure 4:
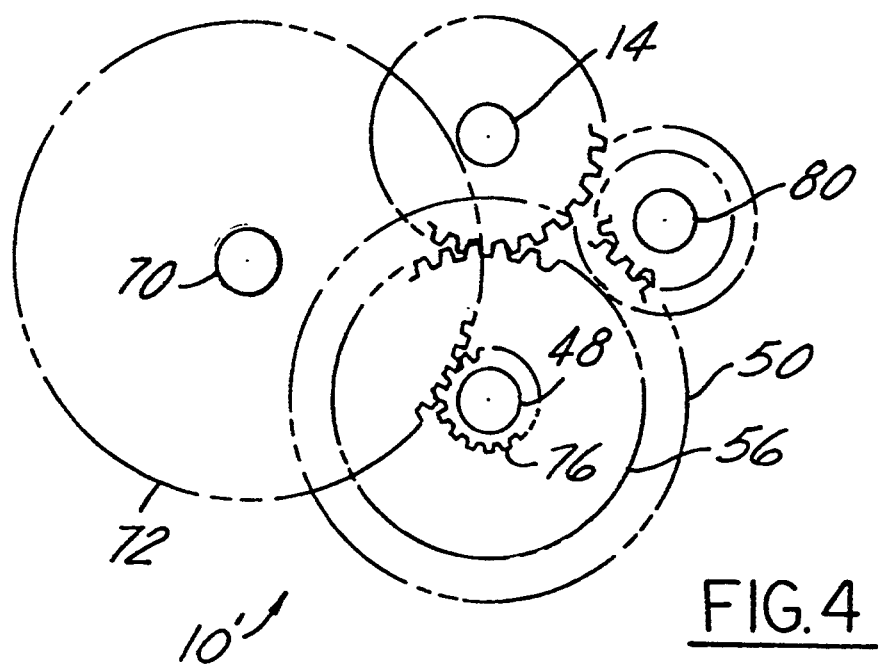
FIG. 4 is an end view showing schematically the transmission shown in FIG. 3.
Figure 3:
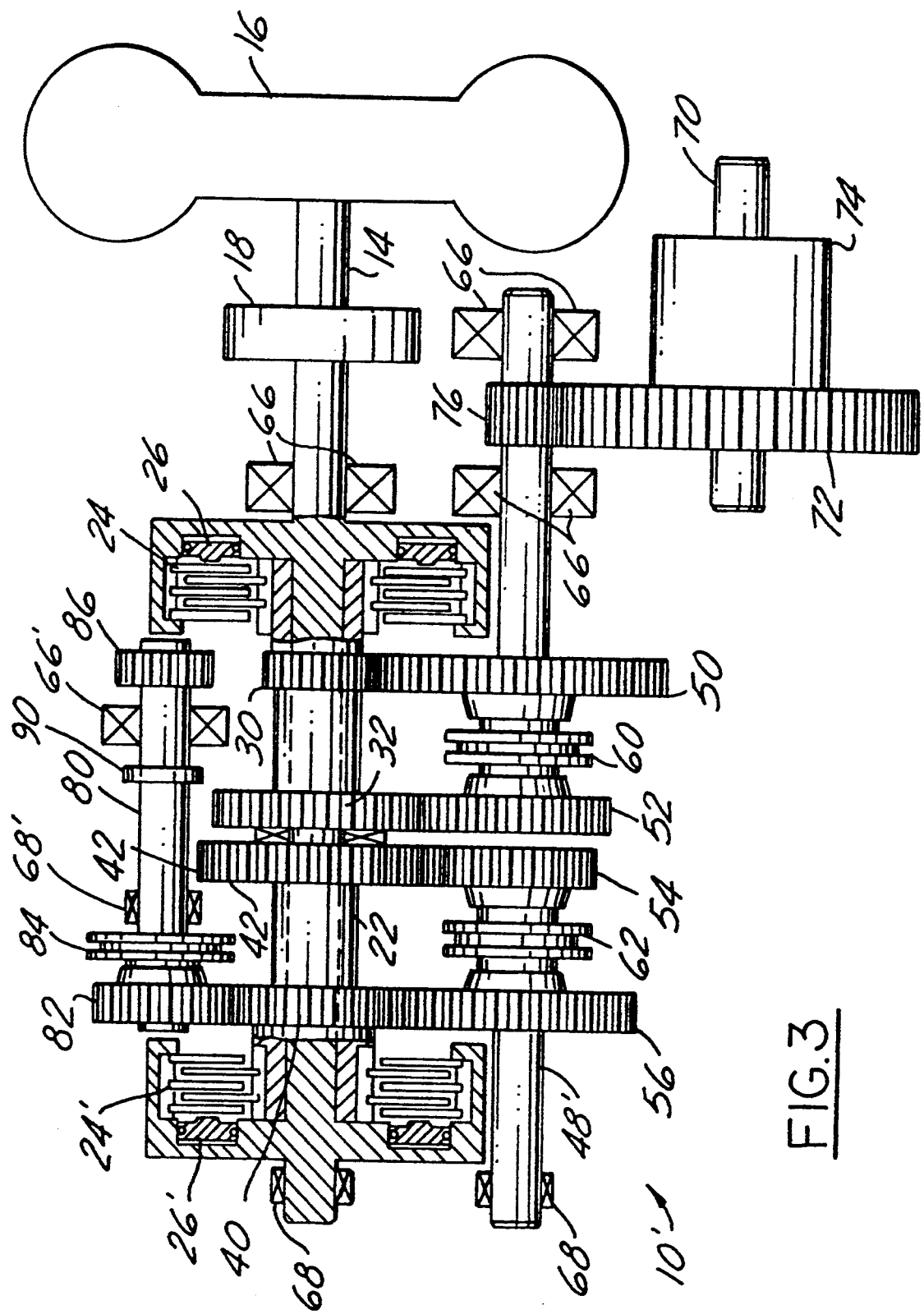
FIG. 3 is a schematic sectional view of an alternate embodiment of a countershaft automatic transmission in accordance with the present invention.

An alternate design 10' of the countershaft automatic transmission in accordance with the present invention is shown in FIGS. 3 and 4. In this embodiment, the components for the transmission are the same as or similar to those for the transmission shown in FIG. 1, but are arranged in a different configuration. Since the components are the same, they are numbered similarly in the drawings. As shown by the alternate embodiment, it is not necessary that the two clutches be packaged in the common housing (such as dual clutch pack 12). In the alternate embodiment, separate clutch packs are utilized.

This alternate embodiment reduces the size of the transmission package because the lay shaft 80 for reverse gear no longer has to avoid and clear the outer radius of the clutch pack and can be brought closer to the main shaft 14. In this embodiment, however, it is necessary to locate the bearings 66′ and 68′ for the reverse lay shaft 80 inboard of the gears on that shaft.

In operation, the embodiment shown in FIGS. 3 and 4 functions in the same manner as the embodiment described above with reference to FIGS. 1 and 2.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

What is claimed is:

1. An automatic transmission comprising:

a transmission housing;

a main shaft rotatably mounted in said housing;

a countershaft in said housing spaced from and parallel to said main shaft;

first gearing mounted on said main shaft;

second gearing mounted on said main shaft;

first clutch means and second clutch means mounted on said main shaft for respectively connecting selectively said first gearing and said second gearing to said main shaft, said first and second clutch means being disposed between said first and second gearing and being located respectively adjacent said first gearing and said second gearing;

third gearing and fourth gearing mounted on said countershaft in engagement with said first gearing;

fifth gearing and sixth gearing mounted on said countershaft in engagement with said second gearing;

said transmission comprising further first synchronizer clutch means on said countershaft for synchronously connecting said third gearing and said fourth gearing to said countershaft and second synchronizer clutch means on said countershaft for synchronously connecting said fifth gearing and said sixth gearing to said countershaft;

a lay shaft arranged in parallel disposition with respect to said main shaft and a first reverse gear on said lay shaft engaging said first gearing.

2. A transmission as set forth in claim 1 including a second reverse gear mounted on and connected to said lay shaft engageable with both said second gearing on said main shaft and said sixth gearing on said countershaft.

3. The combination as set forth in claim 2 wherein said transmission comprises a third synchronizer clutch means on said lay shaft for connecting said first reverse gear to said lay shaft synchronously.

4. The combination as set forth in claim 3 wherein said transmission comprises a parking wheel, said parking wheel being positioned on said lay shaft.

5. The combination as set forth in claim 4 wherein said parking wheel forms a part of said second synchronizer clutch means.

* * * * *

UNITED STATES PATENT AND TRADEMARK OFFICE
CERTIFICATE OF CORRECTION

PATENT NO. : 5,385,064
DATED : January 31, 1995
INVENTOR(S) : John W. Reece

It is certified that error appears in the above-indentified patent and that said Letters Patent is hereby corrected as shown below:

On the title page item [57],

In the Abstract, Line 4, after "synchronizers" delete the "," and insert a --.--;

Column 2, Lines 43 and 44,
   after "shafts;" delete "transmission in accordance with the present invention;".

Signed and Sealed this

Thirty-first Day of October 1995

*Attest:*

BRUCE LEHMAN

*Attesting Officer*      *Commissioner of Patents and Trademarks*